(12) United States Patent
Morley et al.

(10) Patent No.: US 9,274,902 B1
(45) Date of Patent: Mar. 1, 2016

(54) DISTRIBUTED COMPUTING FAULT MANAGEMENT

(71) Applicant: Amazon Technologies, Inc., Reno, NV (US)

(72) Inventors: Adam Douglas Morley, Seattle, WA (US); Barry Bailey Hunter, Jr., Sammamish, WA (US); Yijun Lu, Kenmore, WA (US); Timothy Andrew Rath, Seattle, WA (US); Kiran-Kumar Muniswamy-Reddy, Seattle, WA (US); Xianglong Huang, Bellevue, WA (US); Jiandan Zheng, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 97 days.

(21) Appl. No.: 13/961,720

(22) Filed: Aug. 7, 2013

(51) Int. Cl.
*G06F 11/00* (2006.01)
*G06F 11/20* (2006.01)
*G06F 11/07* (2006.01)

(52) U.S. Cl.
CPC ........ *G06F 11/2002* (2013.01); *G06F 11/0709* (2013.01); *G06F 11/079* (2013.01); *G06F 11/0787* (2013.01); *G06F 11/0793* (2013.01)

(58) Field of Classification Search
CPC .............. G06F 11/0709; G06F 11/079; G06F 11/0793; G06F 11/0787
See application file for complete search history.

(56) References Cited

U.S. PATENT DOCUMENTS

| | | | |
|---|---|---|---|
| 5,914,957 A * | 6/1999 | Dean | G06F 13/4256 370/362 |
| 6,460,070 B1 * | 10/2002 | Turek et al. | 709/202 |
| 6,675,315 B1 * | 1/2004 | Semler et al. | 714/4.4 |
| 8,527,622 B2 * | 9/2013 | Moreira Sa de Souza | 709/224 |
| 2006/0031476 A1 * | 2/2006 | Mathes | H04L 67/34 709/224 |
| 2008/0005281 A1 * | 1/2008 | Hsueh et al. | 709/219 |
| 2008/0109683 A1 * | 5/2008 | Erwin et al. | 714/46 |

* cited by examiner

*Primary Examiner* — Charles Ehne
(74) *Attorney, Agent, or Firm* — Baker & Hostetler LLP

(57) ABSTRACT

An automated system may be employed to perform detection, analysis and recovery from faults occurring in a distributed computing system. Faults may be recorded in a metadata store for verification and analysis by an automated fault management process. Diagnostic procedures may confirm detected faults. The automated fault management process may perform recovery workflows involving operations such as rebooting faulting devices and excommunicating unrecoverable computing nodes from affected clusters.

20 Claims, 14 Drawing Sheets

DISTRIBUTED COMPUTING FAULT MANAGEMENT

BACKGROUND

A distributed computing system may be composed of many computing nodes. Depending on the architecture of the distributed system, each of these nodes may comprise numerous hardware components such as memory, storage devices and so forth, all of which have the potential to fail. In addition, the software components operating on the computing nodes may be subject to various faults, crashes, performance degradations and so forth. In some cases, the faults may cause the immediate failure of a computing node, while in others the fault may portend an approaching failure. In yet other cases, a fault may be safely ignored. Accordingly, management of a distributed computing system may involve investigating and responding to numerous faults and conditions. A delayed response to these faults and conditions may have a variety of detrimental effects, such as increasing the risk of a serious failure or increasing the length of time a computing node is unavailable.

BRIEF DESCRIPTION OF DRAWINGS

The drawings provided herein are designed to illustrate example embodiments and are not intended to limit the scope of the disclosure.

DETAILED DESCRIPTION

Distributed computing systems may employ numerous computing nodes and related hardware components such as memory banks, processors, storage devices, routers, switches and so on, each of which has the potential to fail or to cause other components to fail. Various strategies may be employed to improve resiliency, such as failover and replication groups. However, component failures remain a source of cost and risk even when such strategies are employed.

Figure 1A:
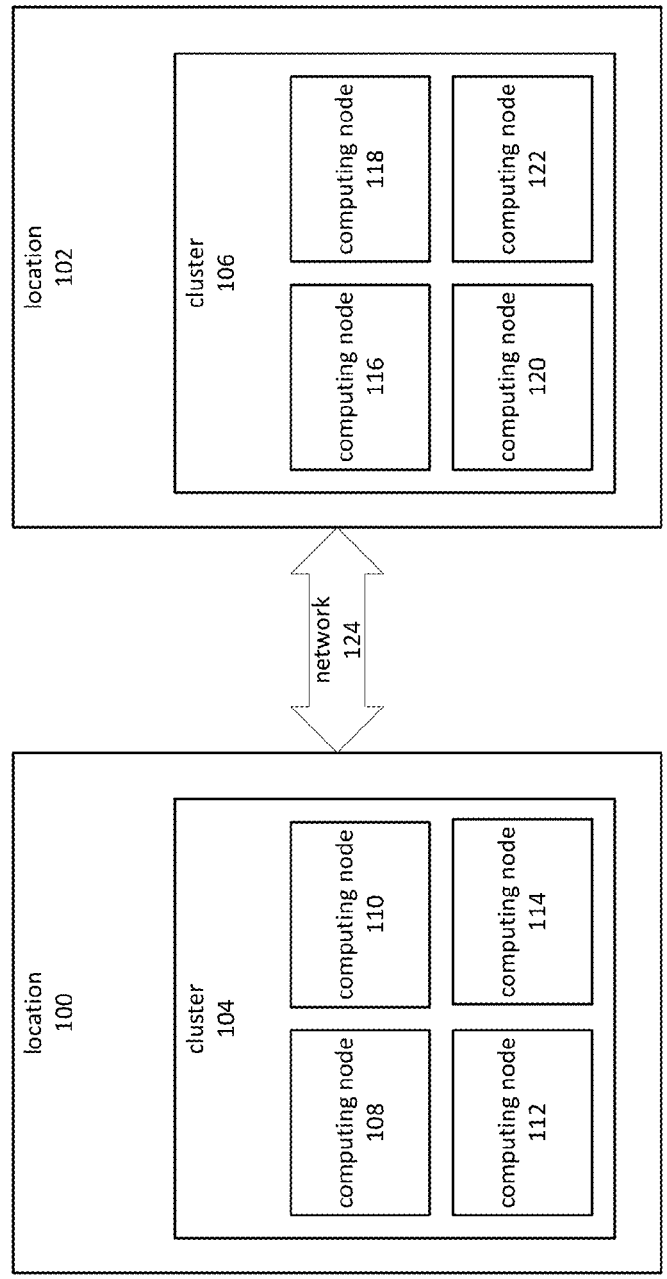
FIG. 1A is a block diagram depicting an embodiment of a data center distributed between multiple locations.

An automated system may be employed to perform detection, analysis and recovery from failures occurring in a distributed computing environment, such as the system depicted by FIG. 1A. A network of computing resources may be distributed over multiple locations 100 and 102, connected by network 124. Computing resources may be located in separate regions to provide resiliency in the event of network disruptions, power failures, natural disasters and so forth. Locations may also be chosen based on distribution of network traffic, so that resources serving particular geographic locations may be located nearby. In some cases, locations may be nearby or even situated in the same facility. In such cases, embodiments may provide separate network inputs, power lines and so forth in order to minimize the chance of more than one location becoming unavailable at the same time.

At each location, computing nodes may be grouped together to form what may be described as a cluster. In various instances, a cluster may represent a failover group, a set of computing nodes performing related or identical functions or an arbitrary collection of computing nodes. A cluster may also comprise various additional computing resources such as routers, switches, storage devices, server racks, power supplies and so forth. A cluster at one location may be configured to be ready to assume the role of another cluster at a separate location. For example, cluster 104 and 106 might act as nodes in a distributed database and share replicated data. Should cluster 104 become unavailable, its duties might be assumed by cluster 106.

For clarity in presentation, FIG. 1 depicts location 100 as comprising a single cluster 104 and location 102 as comprising a single cluster 106. However, embodiments may consist of a number of locations each comprising a number of clusters.

Cluster 104 might initially comprise computing nodes 108, 110, 112 and 114, and cluster 106 might initially contain computing nodes 116, 118, 120 and 122. However, at some point one or more of these computing nodes might cease to operate or otherwise become unavailable. In some cases, this may be the result of unplanned failure. In other cases, a computing node might be taken offline temporarily in order to install software, perform hardware maintenance and so forth. The length of time computing nodes are offline may be a factor that influences operating costs. If the average length of time that computing nodes are offline were to increase, the average length of time that computing nodes are online would correspondingly decrease. Additional hardware might therefore be purchased to keep available computing power at a constant level.

Various factors may contribute to increased downtime. One such factor is human intervention. When problems occur, technical personnel may be called upon to diagnose faults, repair faulty hardware, initiate reboots, perform system configuration and so forth. In some cases, even if a task can be performed quickly there may be a delay before personnel are able to turn their attention to the task. In other cases the task itself may take a long time. Some tasks, such as reboots, disk consistency checks and so forth may take a significant amount of time. Other tasks may require many steps or be prone to errors that must be corrected before the task can be completed.

Hardware availability may also affect downtime. Hardware failures may require new equipment such as replacement storage devices, switches, routers, memory, processors and so forth. Drafting and submitting a purchase order, waiting for parts availability, shipping time and so forth may lengthen the time that the faulty equipment is offline and waiting for repair.

Another example of a factor contributing to increased downtime is poor management of risk. For example, maintenance operations might be performed on a computing node with a relatively low probability of failure but deferred on a computing node with a high probability of failure. In some cases, taking a computing node offline for maintenance might subject other computing nodes to increased workload and increase the risk of sudden failure. Downtime could be reduced by performing various maintenance procedures in an order determined to involve the least risk of sudden failure and to involve the least consequence of failure, should one occur.

Figure 1B:
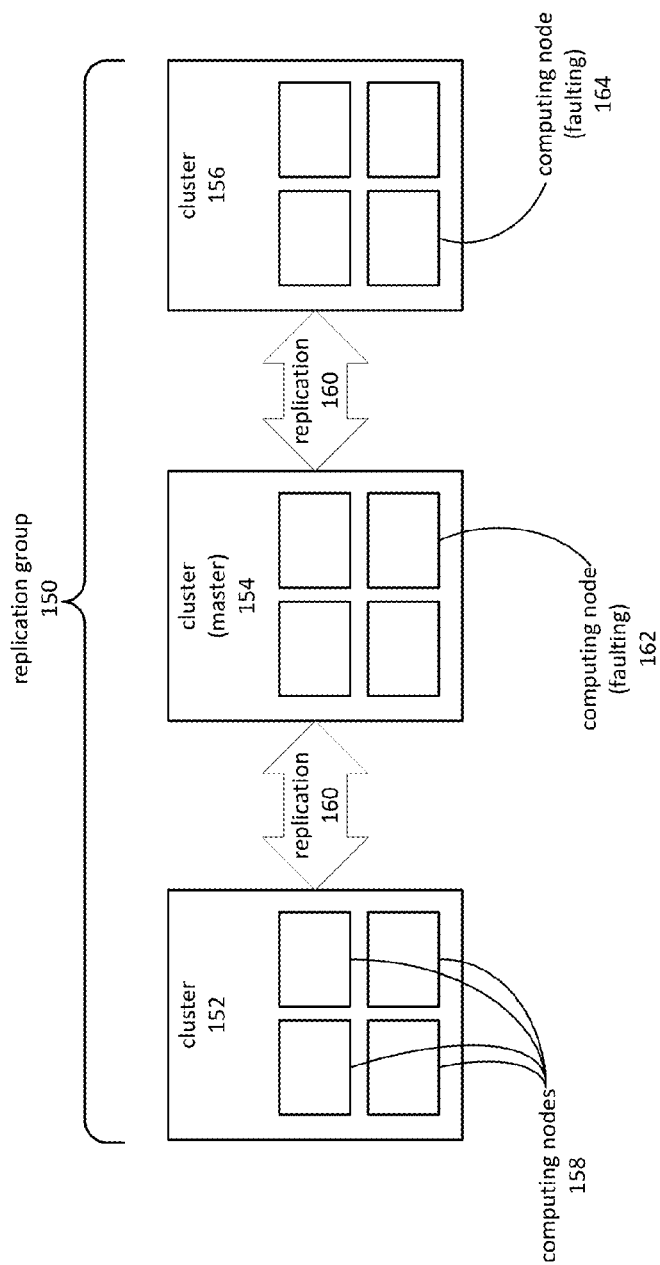
FIG. 1B is a block diagram depicting replication of data in a distributed database system showing examples of potential failure points.

In a distributed database system, replication groups may be used to mitigate the consequences of system downtime. FIG. 1B depicts an embodiment of a replication group 150 comprised of three clusters 152, 154 and 156. Each cluster may contain one or more computing nodes 158. A replication group may be defined to have one or more masters, which may contain definitive representations of the data managed by the system. In some embodiments, a quorum-based mechanism may be used to ensure transaction consistency. Data may be replicated from the masters to other members of the replication group, which may serve materialized views of the data to clients. In FIG. 1B, the master is depicted as cluster 154, while clusters 152 and 156 are depicted as receiving replicated data through replication process 160.

At various times during the course of operation, one or more computing nodes may be encountering faults of some kind. Various non-limiting examples of faults include hard faults such as power failure, failed memory circuits, corrupted storage devices and so forth. Faults may also include soft faults, which may for example include poor performance, bad storage device sectors, software errors and other conditions less impactful than outright failure. Faults may be specific events or ongoing conditions.

Embodiments may perform proactive fault detection and recovery to minimize the length of downtime and to mitigate the consequences of a fault. For example, in FIG. 1B computing nodes 162 and 164 may undergo faults of some kind. An automated mechanism may be employed to detect the faults, analyze them and perform one or more operations to recover from the fault. In addition, an automated process may be employed to perform steps to mitigate downtime and risk associated with the fault as well as any corresponding recovery or maintenance procedures. For example, because computing node 162 is a member of cluster 154, the master of replication group 150, the consequence of sudden failure might be more consequential than the sudden failure of computing node 164 in cluster 156. An automated fault detection, analysis and recovery mechanism might determine to perform an orderly transition of the master role from cluster 154 to cluster 152 after determining that cluster 154 is likely to fail and that cluster 152 currently has the least risk of failure. For example, a value indicative of a level of risk might be assigned to each of cluster 152 and 154, and then compared. The automated mechanism might also schedule operations to correct the fault at computing node 164 after cluster 154 has resumed normal operation as a master in replication group 150.

Figure 1C:
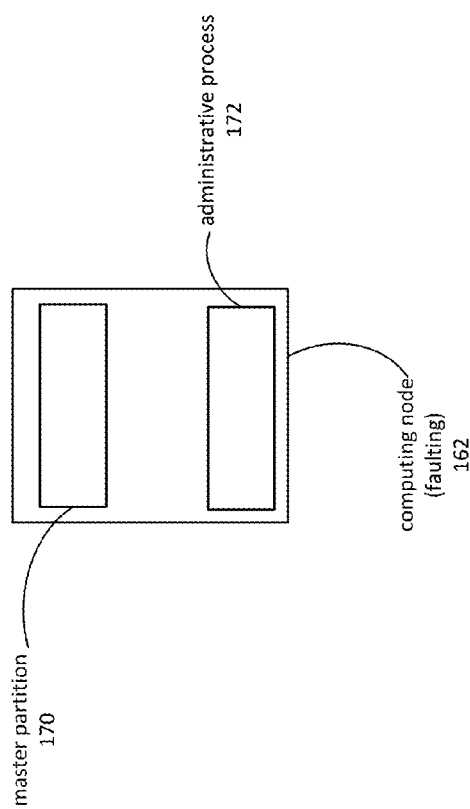
FIG. 1C is a block diagram depicting a faulting computing node hosting a master partition for a database table and an administrative process.

FIG. 1C depicts processes and data hosted on computing node 162. Master partition 170 may comprise a store of data accessible through computing node 162. The data may be replicated to other computing nodes, such as one or more of computing nodes 158 depicted in FIG. 1B. A number of partitions may be hosted on computing node 162. Other types of data and processes may be hosted by computing node 162, such as administrative process 172. In the event of a fault, other computing nodes may assume one or more of the functions performed by computing node 162. In various cases the fault may not immediately result in disruption to the function performed by computing node 162, but may be an indication that downtime may occur at some time in the future.

Figure 2:
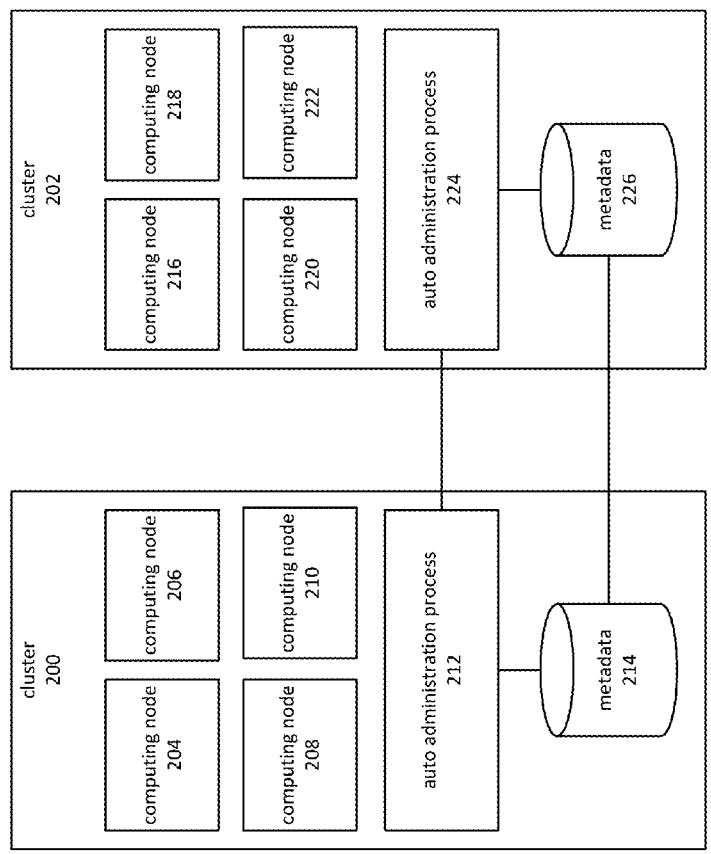
FIG. 2 is a block diagram depicting distributed clusters of computing nodes with distributed processes for automated fault management.

FIG. 2 depicts an embodiment of a system that performs automated fault detection, analysis and recovery. A cluster 200 might comprise computing nodes 204, 206, 208 and 210. An auto administration process 212 may perform operations related to fault detection, analysis and recovery for computing nodes in cluster 200, such as computing nodes 204, 206, 208 and 210.

In some embodiments, auto administration process 212 might communicate with auto administration processes in other clusters, such as auto administration process 224 in cluster 202. Communication between auto administration modules may allow coordination and prioritization of administrative tasks between clusters.

In various embodiments, auto administration process 212 may perform fault detection, analysis and recovery only for computing nodes within its own cluster, such as cluster 200. However, in other embodiments auto administration process 212 might perform fault detection, analysis and recovery for some or all of the computing nodes at a particular location. In other words, a single auto administration process may be associated with any number of computing nodes regardless of cluster association. Embodiments may, however, track associations between clusters and computing nodes so that cluster membership is considered during the fault detection, analysis and recovery process.

A repository of metadata 214 may be associated with cluster 200. In some embodiments metadata 214 may be stored on a database management system operating within cluster 200. Embodiments may utilize a distributed database management system, for example storing metadata on cluster 200 and replicating to cluster 202. A repository for metadata 214 may be dedicated to a single location, to multiple locations, to a specific cluster such as cluster 200 or other combinations. Instead of or in addition to database management systems, embodiments may utilize log files, binary files, XML data, short or long-term memory, queues, messaging systems and so forth to maintain a store of metadata.

Faults may be detected using various methods and recorded in a metadata store. Methods of fault detection include active and passive methods performed locally to the faulting computing node. For example, software operating on one of computing nodes 216, 218, 220 or 222 might handle an exception. Information about the exception could be written to metadata 226 associated with cluster 202. Another example involves utilizing a monitoring process on a computing node to record statistics, including performance metrics such as CPU utilization, working set and so on.

In some cases a computing node may be unable to report that it has faulted. This may occur, for example, when the computing node's power supply fails or the computing node has entered an endless reboot cycle. To detect faults in situations such as these a process such as auto administrator 224 might perform various tests on a periodic basis to determine if a machine has faulted, and if so to collect various additional pieces of information about the fault. For example, auto administration process 224 might send heartbeat messages to computing node 216 to verify that it remains responsive. In addition to simple heartbeats, embodiments may employ other test forms such as periodically triggering a read or write operation on a storage device controlled by computing node 216. Embodiments may also perform cross-cluster or cross-location tests to detect when an associated cluster or location has gone offline and is unable to report. For example auto administration process 224 might periodically send a heartbeat message to computing node 204. Alternatively, heartbeat information might be stored in metadata 214 or 226 and monitored by auto administration processes 212 or 224.

In various embodiments, a process such as auto administration processes 212 may monitor metadata 226 for faults occurring in cluster 202 or its corresponding location, and may also monitor metadata 214 for faults occurring in another cluster or location. Monitoring metadata may involve querying a table of metadata for rows indicating a fault condition. Embodiments may also use triggers, message queues or other active or passive notification systems.

In response to detecting a fault, auto administration process 212 may perform an operation to attempt recovery from the failure, or take various other compensating actions. The operation may also be scheduled for later processing, and may be scheduled based on various prioritization factors such as risk minimization, status of other computing nodes in the cluster, status of other clusters and other locations, hardware availability, personnel schedules and so forth.

Figure 3A:
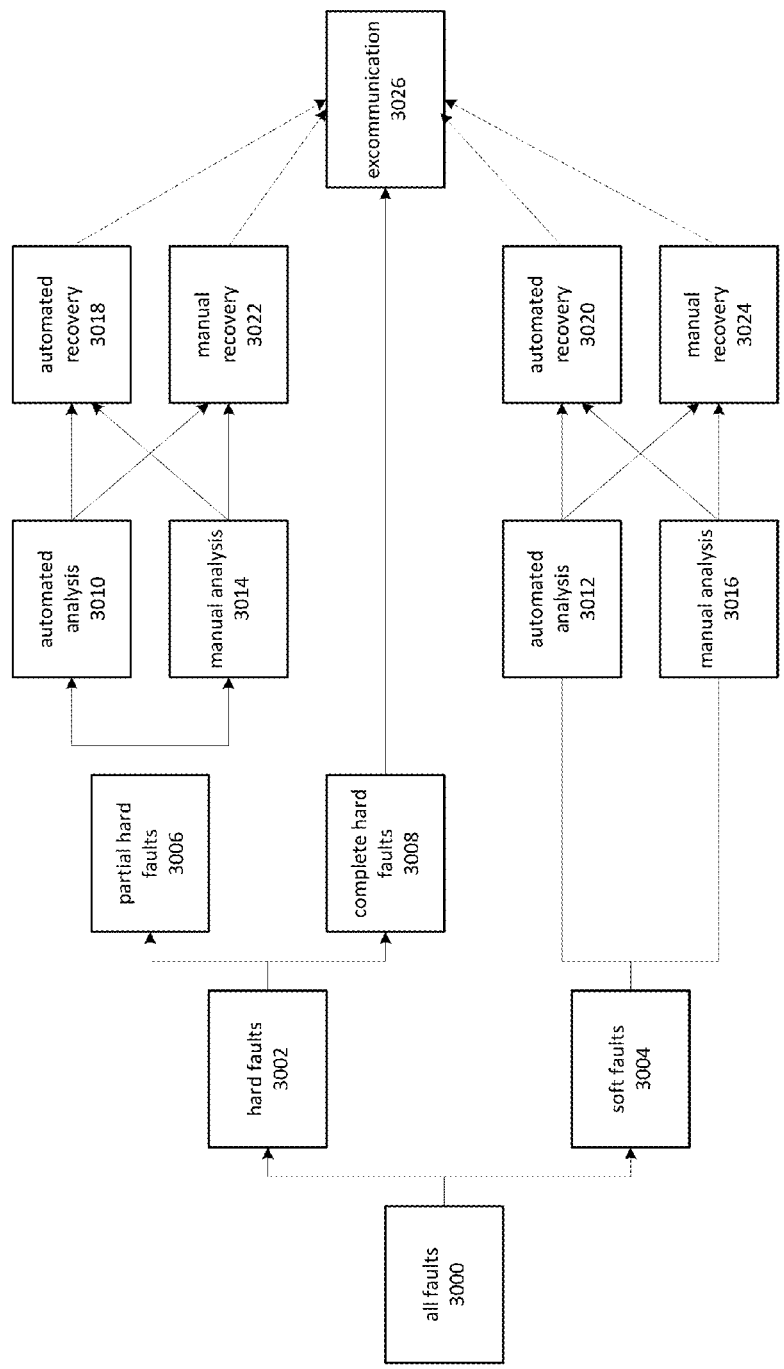
FIG. 3A is a diagram depicting classification, analysis and recovery from faults.

FIG. 3A depicts a generalized view of fault classification, analysis and recovery. A fault of some kind, such as the various types described herein, is depicted as fault 3000. Faults may be generally categorized as hard faults 3002 or soft faults 3004. Hard faults 3002 may include various forms of hardware failures, as well as some types of software-based errors. An example of the latter might be corruption of operating system files, infection with a virus or other malware, and so on. Hard faults 3002 may be characterized as causing some level of incapacity in the functioning of a computing node or related system. Hard faults 3002 may be further classified as being partial hard faults 3006 or complete hard faults 3008. Partial hard faults 3006 may involve a component failure that causes some aspect of system functionality to fail completely, while other aspects remain functioning. For example, a drive in a redundant array of inexpensive disks ("RAID") might fail, but the array might continue to function. Complete hard faults 3008 might involve a power supply failure or other event which renders the computing node non-functional.

Soft faults 3004 may be characterized as involving a reduction in capacity, performance, or other characteristic. Various non-limiting examples of soft faults 3004 include software-based exceptions, event log conditions indicative of potential current or future problems, performance degradation and so forth. Various operating conditions such as a reduction in available storage capacity may be classified as soft faults.

Partial hard faults 3006 and soft faults 3004 may result in automated analysis 3010 or 3012, which may include one or more steps to analyze or verify a detected fault. These steps may include performance of diagnostic tests, automated analysis of log files and so forth. Manual analysis 3014 or 3016 may also be performed for certain fault types not amenable to automated verification or analysis. Embodiments may also perform combinations of automated and manual analysis.

Various recovery actions, such as automated recovery 3018 and 3020 or manual recovery 3022 and 3024, may be performed subsequent to analysis. Embodiments may also attempt recovery without performing analysis. Various non-limiting examples of recovery actions include rebooting, restarting software components, upgrading software, upgrading firmware, swapping hard drives and so forth. Recovery actions may be followed by additional diagnostic procedures to verify that the fault has been resolved.

If a fault has not been resolved, it may be excommunicated from its cluster. This may involve removing the node from performing a distributed computing function. Excommunication may also be followed by additional recovery steps, such as those that may take a comparatively long period of time such as ordering replacement parts, upgrading hardware and so forth. Excommunication may be performed directly subsequent to complete hard faults 3008. Excommunication may be followed by various forms of analysis and recovery. An excommunicated component or computing node may be reincorporated into the system once its functioning has been restored. In some embodiments, an automatic recovery action such as a power cycling may be attempted on a computing node or component that has undergone a complete hard fault.

Figure 3B:
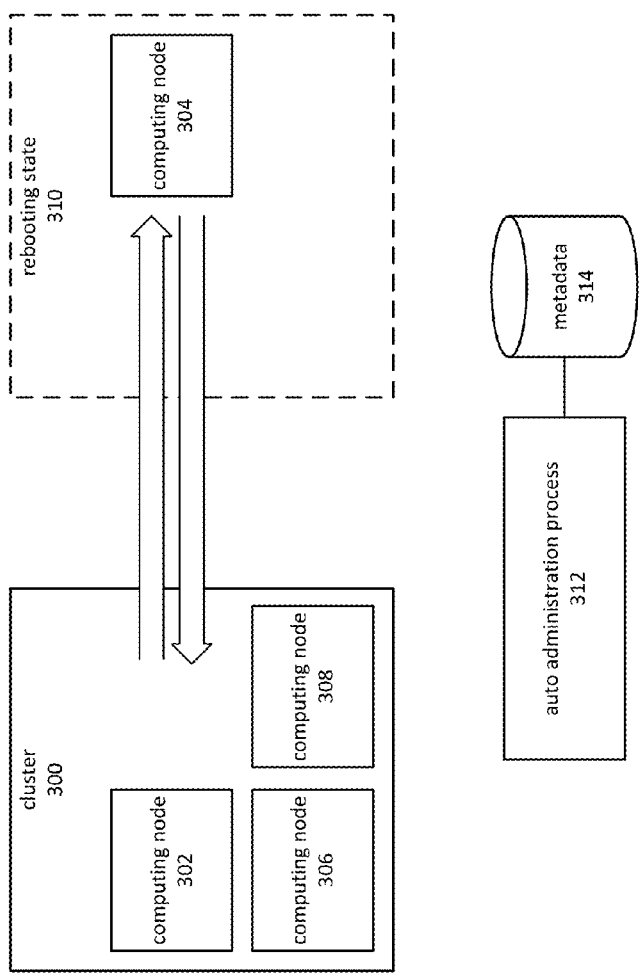
FIG. 3B is a block diagram depicting automated rebooting of a faulting member of a cluster of computing nodes as one example of automated recovery.

FIG. 3B depicts an embodiment of one type of recovery action. A cluster 300 may be comprised of computing nodes 302, 304, 306 and 308. Auto administration process 312 may detect that computing node 304, for example, has entered a faulting state. In some embodiments, auto administration process 312 may receive, from an external source such as one of computing nodes 302, 306 and 308 that computing node 304 has faulted.

Upon receiving a notification that computing node 304 has faulted, auto administration process 312 may determine to cause computing node 304 to reboot as a means of recovering from the noted fault. Non-limiting examples of factors that may be considered in the determination include a count of previous reboot attempts, historical pattern of the noted fault, historical pattern of related and unrelated faults, correlation between the noted fault and known solutions, a need to retain the current state of the computing node for diagnostic purposes and so forth. Any of various hardware and software-based mechanisms for forcing a reboot of computing node 304 may be employed.

Embodiments may consider computing node 304 to be in a rebooting state 310 upon determining that a reboot is to be triggered, and continuing until no further reboots are scheduled. Embodiments may in some cases trigger more than one reboot cycle in response to various faults. Upon a successful reboot, computing node 304 may write information to metadata 314 indicating that a reboot has been successful. Auto administration process 312 may detect the metadata, and remove computing node 304 from rebooting state 310 so that it may resume normal operation. A successful reboot may also be detected through mechanisms such as heartbeat detection. Following a reboot, metadata 314 may be monitored for recurrence of the fault or faults that led to the reboot.

Embodiments may employ various mechanisms for updating nodes, clusters and locations regarding the status of computing node 304 and cluster 300. The mechanisms may include sending a notification prior to computing node 304 entering rebooting state 310, possibly incorporating a veto mechanism. In some cases, a cluster related to cluster 300 may have reason to delay rebooting computing node 304, for example because one or more computing nodes in the related cluster are already in a rebooting state. Cluster 300 may also receive notifications from a related cluster which may influence placing computing node 304 into a rebooting state. Embodiments may employ a store of metadata 314 for providing notifications, or various other mechanisms such as broadcast notifications, targeted messages and so forth.

Figure 4:
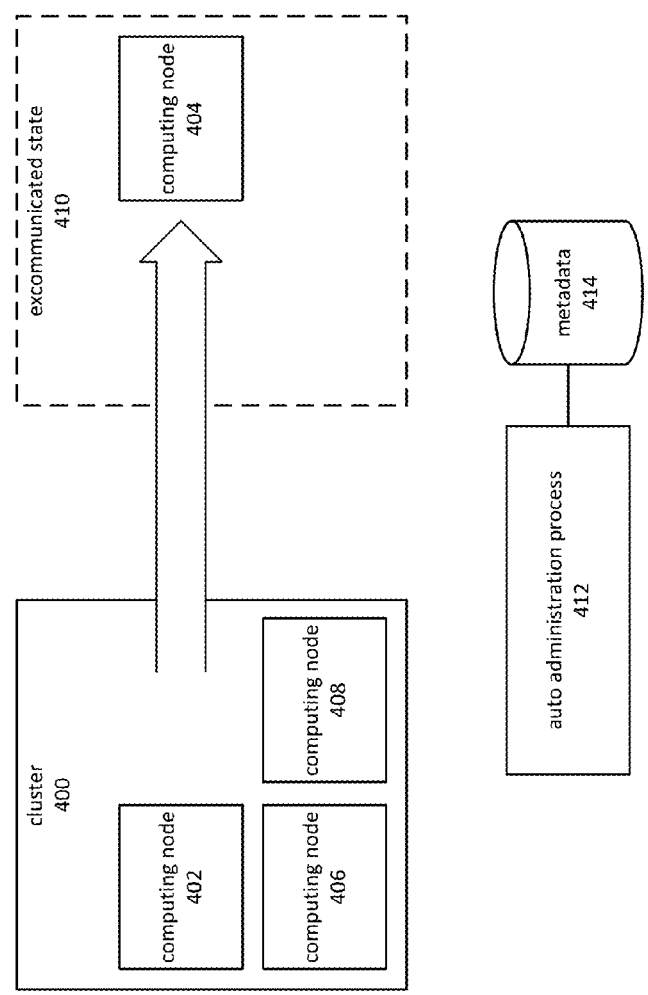
FIG. 4 is a block diagram depicting automated excommunication of a faulting computing node from a cluster of computing nodes.

In some cases a reboot may not resolve an underlying fault, or may be followed by new faults. Embodiments may classify faults subsequent to the reboot as those that may be at least temporarily ignored, those that might be resolved by additional reboots and those that warrant further action. FIG. 4 depicts an example of an action that may be taken upon determining that a reboot or other form of corrective action is not sufficient to resolve a detected fault. Various embodiments may also perform the depicted action without attempting to resolve a detected fault.

Cluster 400 may initially be comprised of computing nodes 402, 404, 406 and 408. Upon detecting that computing node 404 has faulted and optionally determining that the fault is not resolvable by reboot or other mechanism, auto administration process 412 may determine that computing node 404 should be excommunicated from cluster 400. Excommunicating computing node 404 may be described as placing it in excommunicated state 410. When placed in this state, computing node 404 generally does not participate in the responsibilities of cluster 400. The role performed by computing node 404 might be taken up by one of existing computing nodes 402, 406 and 408, or by a computing node to be added to cluster 400. In some cases, an excommunicated node such as computing node 404 may be made available for log-shipping, replication, backup production and so forth. Excommunicated computing node 404 may be subsequently examined by technical personnel, undergo automated diagnostics and so forth. A record of computing node 404 entering excommunicated state 410 may be added to metadata 414. Some embodiments may send notification of computing node 404 entering excommunicated state 410 to various entities, such as other computing nodes in cluster 400, or to other clusters or locations. Notification may be made through various mechanisms such as through metadata 414, broadcast notifications, targeted messages and so forth.

Embodiments may perform various automated or manual procedures for analyzing an excommunicated computing node and preparing the excommunicated computing node for further use. For example, upon placing computing node 404 into excommunicated state 410, auto administration process 412 might schedule a sequence of operations for diagnosing the condition that led to the excommunication of computing node 404. Non-limiting examples of operations that may be performed include scheduling an appointment for technical personnel to examine the hardware, producing dump files, archiving files, installing debugging software and so forth. Auto administration process 412 might also schedule various recovery operations, including upgrading software, reimaging, ordering replacement hardware, scheduling an appointment for technical personnel to upgrade the hardware and so forth.

Embodiments may perform excommunication on entities in addition to computing nodes, such as drives, software components and so forth. In general terms, excommunication may involve reconfiguring a system to exclude attempts to utilize the excommunicated component, and where possible configure the system to use a replacement component somewhere in the system. Embodiments may determine to perform excommunication based on repair boundaries. Repair boundaries may be considered to be a unit to be taken offline during the course of a repair. Automated and/or manual diagnostic procedures, as described herein, may be used to determine the boundary of a fault. Automated and/or manual procedures may be used to attempt to correct the fault, but if such attempts do not succeed, excommunication may be necessary. In some cases, such as when a hot-swappable storage device fails, the repair boundary may coincide with the fault boundary. In others, such as when a drive cannot be replaced without downtime for the associated computing node, the repair boundary may be at level of the computing node. In some cases, the repair boundary may comprise one or more clusters or other sets of computing nodes. Various mappings or rule-based techniques may be employed to determine the repair boundary corresponding to a fault boundary, based on factors such as the type of fault that has occurred and the results of diagnostic procedures.

Figure 5A:
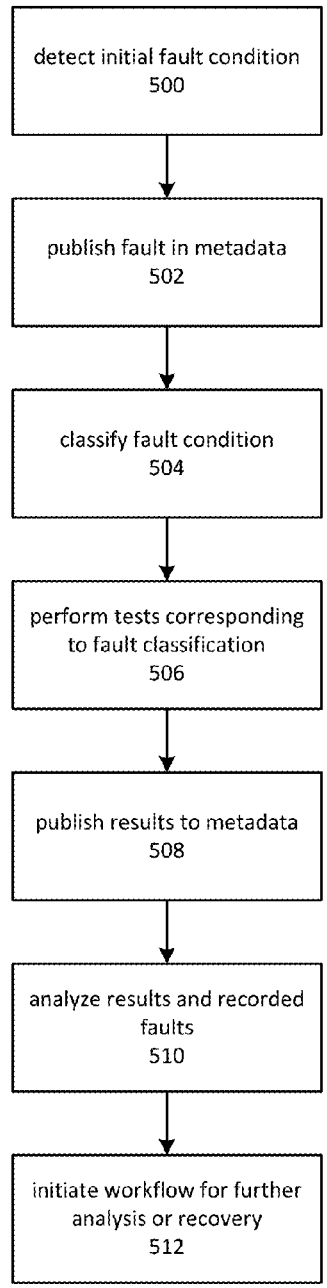
FIG. 5A is a flowchart depicting an embodiment of a process for automated fault detection, analysis and recovery.

Embodiments may perform active detection and/or diagnosis of fault conditions, in addition to or instead of passive detection. Active testing may be used to verify or refine diagnoses related to faults that have been detected or observed. FIG. 5A depicts an embodiment of a process for detecting, diagnosing and responding to faults. Although depicted as a sequence of operations, those of ordinary skill in the art will appreciate that at least some of the depicted operations may be altered, omitted, reordered or performed in parallel.

At operation 500, an initial fault condition may be detected. Embodiments may detect an initial fault condition on a faulting computing node or through an external process. Software operating on the faulting computing node may, for example, handle an exception thrown as a result of various conditions such as read failures, write failures, out of memory conditions and so forth. Another possibility involves a local or remote process monitoring event logs produced on the computing node. Events such as excess temperatures, checksum failures, bus timeouts, machine check exceptions, memory hierarchy errors and so forth may be monitored. Embodiments may apply a classification process to determine which fault conditions require further testing and analysis. A count of the number of times a particular fault has occurred may be compared to a threshold value to determine if further testing and analysis is to be performed.

Detected errors may be published to a store of metadata, as depicted by operation 502. Upon receiving an indication that a fault has occurred, an auto administration process may write an entry to a metadata store. Embodiments may utilize a local metadata store, or a metadata store shared among computing nodes or clusters. Embodiments may employ shared metadata in order to provide for resiliency in the event that part of the metadata store should become unavailable. The entry may comprise elements such as a description of the fault, an internet protocol ("IP") address for the computing node that experienced the fault, information concerning the observed frequency of the error, information providing a classification of the error and so forth. Embodiments may selectively choose which faults to record in metadata and may apply classification and prioritization to the detected fault. The metadata entries may be written to enable various processes, such as auto administration processes in the local cluster as well as remote clusters, to react to the fault in some way consistent with the present disclosure.

Embodiments may perform operation 504 to classify the fault. The classification may be based on a mapping between fault types and optimized or preferred responses. For example, the preferred response to an out-of-memory condition might be a reboot process while the preferred response to a machine check might be excommunication. Various factors may be included in classifying a fault, including but not limited to the type of fault, the frequency of repetition, how recently the fault occurred and so on. Various test or recovery operations may then be performed based on the classification. A messaging system or queue might be employed to send information to a process capable of executing the required test or operation.

A fault may also be analyzed according to its potential origin. Fault handling may involve propagation of the error through various hardware and software layers. Each layer may have its own means of representing the error. In addition, the semantic meaning of the error may change with each layer. For example, a fault incurred while writing to a storage device might have its origin in a bad disk sector. A component operating outside of the storage device might report that a file could not be written. However, upon receiving an indication of a fault that occurred while storing a file, embodiments may determine that a particular storage device is the likely origin of the error. Doing so allows for more appropriate selection of diagnostic tests to verify the origin of the fault and for more effective corrective action.

In various embodiments, operations 502 and 504 may be consolidated. For example, a fault may be classified prior to publishing the fault in metadata, so that information indicative of the fault classification is written to a metadata store. In some embodiments, unclassified fault information may be published to a local metadata store. Upon classification, an entry describing the classified fault may be placed in an external metadata store. Classified faults may be stored to await further action in response to the fault, such as performance of diagnostic and/or corrective procedures.

Operation 506 depicts performing one or more tests corresponding to the detected fault and/or classification of the fault. A process, such as an auto administration process, may receive requests to perform the tests through a messaging system or queue. Embodiments may perform messaging by using entries in a metadata store. Entries may be removed from a queue or marked as completed in a metadata store once the corresponding test has been performed.

For faults related to the operation of storage devices such as hard disk drives, solid-state drives and so forth, embodiments may perform further write tests and/or read tests. A write test might involve writing to a location on the storage device that experienced the fault and then verifying the result through a read operation, checksum and so forth. Read operations may be performed in a similar fashion based on reading a location whose contents are known.

Embodiments may react to machine checks or other general hardware errors by performing tests covering a broad spectrum of potential conditions. For example, a detailed log analysis might be performed in response to a machine check. Embodiments might also perform various tests, such as a detailed log analysis, followed by scheduling an analysis by technical personnel.

Faults related to performance issues may be handled in a variety of ways, such as beginning to monitor performance metrics related to the performance issue, scheduling hardware upgrades, scheduling software upgrades, generating reports for analysis and so forth.

Software-related errors such as crashes may be handled by archiving crash dumps, performing an inventory of installed software components, performing software component upgrades and so forth. In some embodiments the machine may be held offline or excommunicated, in the crashed state, for analysis by technical personnel.

Operation 508 involves publishing results of any tests performed to a store of metadata. The results of the tests may be recorded so that they can be retrieved along with any fault records. This approach allows factors such as the frequency of detected faults to be combined with test results to determine a course of action for further recovery or analysis. Some embodiments may determine a course of further recovery or analysis based only on one or more test results. Operation 510 depicts analyzing test results and recorded faults to determine a course of action. The analysis may involve simple mapping, application of a rule-based system, application of a procedural decision-making function and so forth. Some embodiments may omit operation 508 and initiate a workflow at operation 512 based on results from operation 510.

At operation 512, embodiments may schedule a workflow to initiate further analysis or recovery actions in response to the recorded faults and test results. A workflow may be described as a sequence of related operations which may be performed according to a prescribed sequence, or in conformance with relative priority between the operations. For example, a workflow might involve excommunicating a computing node, collecting crash dumps, performing automated log analysis, and analysis by technical personnel. The step of excommunicating the computing node might have highest priority and be performed first, while analysis by technical personnel might have the lowest priority and be performed last. The other steps might be performed in any order or in parallel. Mechanisms for processing workflows may also allow for long intervals between steps, particularly where human intervention is desired.

Scheduling a workflow may comprise publishing an indication of actions to be performed to a metadata store. The metadata store may be collocated with other fault information, or located separately. A table comprising indications of actions to be performed may be maintained, and items corresponding to an action may be removed from the table or marked as complete once they have been performed.

Figure 5B:
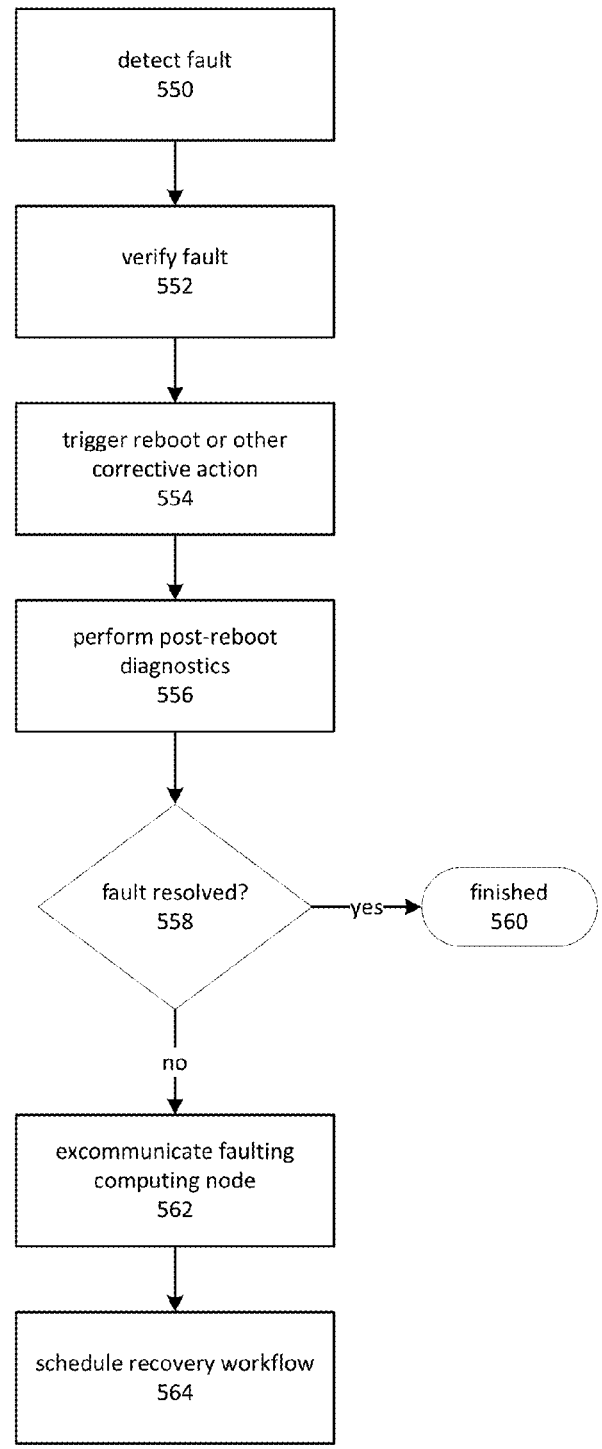
FIG. 5B is a flowchart depicting an embodiment of a process for automated fault detection, analysis and recovery using automated reboot and excommunication.

Another example of an embodiment of a process for detecting, diagnosing and responding to faults is depicted by FIG. 5B. Although depicted as a sequence of operations, those of ordinary skill in the art will appreciate that at least some of the depicted operations may be altered, omitted, reordered or performed in parallel. Many of the depicted operations may be performed by one or more auto administration processes, as described herein.

At operation 550, a fault may be detected using various techniques described in the present disclosure. The fault may be classified as warranting further testing and/or analysis, such as performing a fault verification procedure. Operation 552 depicts verifying a fault by running a diagnostic procure based on the type of fault encountered. In an embodiment, an auto administration process invokes a remote procedure call on the faulting machine to trigger a software process that performs the diagnostic procedure. Embodiments may also use a variety of techniques such as TCP/IP messages, HTTP messages, message queues, web services and so forth to trigger performance of a diagnostic procedure. Some diagnostic procedures may bypass the computing node that reported the fault. For example, a write test might be performed on a storage area network or other device connected to the host of an auto administration process as well as the faulting computing node.

If the fault is verified, a reboot of the faulting computing node may be selected as a recovery action. Operation 554 depicts triggering a reboot of the faulting computing node, or performing some other sequence of corrective actions. An auto administration process may monitor the status of the reboot and perform actions to determine if the recovery has been successful, as depicted by operation 556. Embodiments may, for example, repeat the diagnostic procedures depicted by operation 552. In place of rebooting the faulting computing node, some embodiments may perform alternative recovery procedures, such as restarting software components. Embodiments may determine an appropriate action or set of actions based on the original fault or the results of running diagnostic procedures. For example, if a fault is determined to be originating from a particular component, that component might be power cycled.

Operation 558 depicts determining whether or not the fault has been resolved. The determination may be based on results obtained for post-reboot diagnostics at operation 556, and other factors such as the occurrence of new faults. A faulting computing node may be rebooted, or subjected to other forms of corrected action, and monitored until it becomes operational. Embodiments may repeat previously executed diagnostic procedures to determine if the fault has been resolved. If the fault has been resolved, the diagnostic and recovery process may end, as depicted by finished operation 560. If not, additional diagnostic or recovery operations may be performed.

Operation 562 depicts excommunicating the faulting computing node. The excommunication may be performed as a precursor to performing additional diagnosis and recovery steps. Excommunication may involve substituting a new computing node for the excommunicated node, so that operations of the cluster may proceed normally and without waiting for diagnostic and recovery procedures to complete on the excommunicated computing node.

Scheduling a recovery workflow, as depicted by operation 564, may involve recording one or more entries in a metadata store describing tasks to perform on the excommunicated computing node or other hardware, since recovery tasks may involve computing nodes in addition to those that are faulting. Tasks may be recorded in metadata with information indicative of an optional or required order of processing, possibly including information describing dependencies between tasks. An auto administration process, workflow engine or other mechanism may be utilized to execute the workflows and perform the scheduled recovery operations.

Embodiments may employ a variety of recovery operations in various circumstances. The options include rebooting, excommunication, replacing the affected computing node, scheduling intervention by technical personnel, automatically ordering parts and equipment, adding hardware to a watch list and so on.

Figure 6:
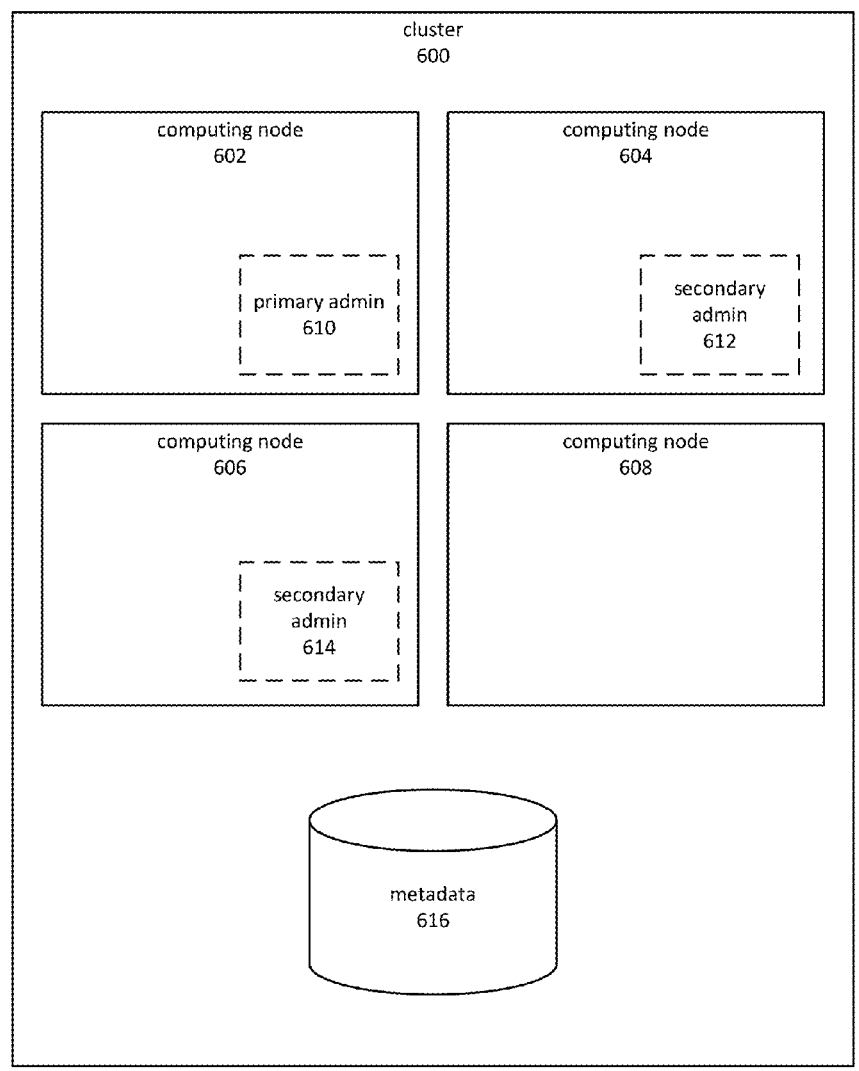
FIG. 6 is a block diagram depicting a cluster of computing nodes hosting distributed processes for performing automated fault detection, analysis and recovery.

An illustrative embodiment of a system for performing various testing and recovery workflows is depicted in FIG. 6. A cluster 600 may be composed of a number of computing nodes 602, 604, 606 and 608. Although only four computing nodes are depicted, embodiments may have more computing nodes than depicted, or fewer. Each of the computing nodes 602, 604, 606 and 608 may perform various functions related to the purpose of the cluster, such as acting as components of a distributed database system. In addition to these functions, some of the computing nodes may serve as components of an auto administration process.

For example, computing node 602 may serve as primary administration process 610. The role of the primary administration process, in some embodiments classify faults, determine which diagnostic tests to perform, schedule recovery operations and so forth. Primary administration process 610 may delegate to secondary administration processes 612 and 614. Embodiments may comprise more secondary administration processes than are depicted in FIG. 6, or fewer.

Each secondary administration process, such as secondary administration processes 612 and 614, may perform tasks delegated to it by primary administration process 610. One delegation technique involves configuring each secondary administration process to be associated with a subset of the computing nodes in the cluster. The subset may include computing nodes hosting a primary or secondary administration process. For example, secondary administration process 614 might be associated with computing node 604, on which secondary administration process 612 resides, and computing node 608. Secondary administration process 612 might be associated with computing nodes 602 and 606. Secondary administration processes 612 and 614 may perform or trigger testing and recovery tasks for the computing nodes they are associated with. Primary administration process 610 may send instructions to one or both of secondary administration processes 612 and 614 to indicate that a task should be performed. Some tasks may be performed autonomously by secondary administration processes 612 and 614. For example, each may monitor its associated computing nodes and report to primary administration process 610 in the event that a fault is detected. Detecting faults may comprise sending or receiving heartbeat messages, monitoring metadata store 616, reading event logs, making calls to remote computer administration functions and so forth.

In the event that computing node 602 should be excommunicated, primary admin process 610 may be relocated to another computing node, such as computing node 608. Executable code corresponding to administration processes, such as primary admin 610, may be located on all or various computing nodes in cluster 600. Embodiments may perform operations to determine the health and operational status of primary admin 610. An external record may be kept of the location on which primary admin 610 is active. Heartbeat mechanisms of various types may be employed to determine that primary admin 610 is operational. Should the heartbeat fail, a new computing node may be selected to host primary admin 610. In various embodiments, an external record may act as a lock, which may be held by currently active primary admin 610. Should primary admin 610 fail to renew the lock, another admin process (such as secondary admin 612 or a process running on computing node 608) may grab the expired lock and assume the role of primary admin 610.

Figure 7:
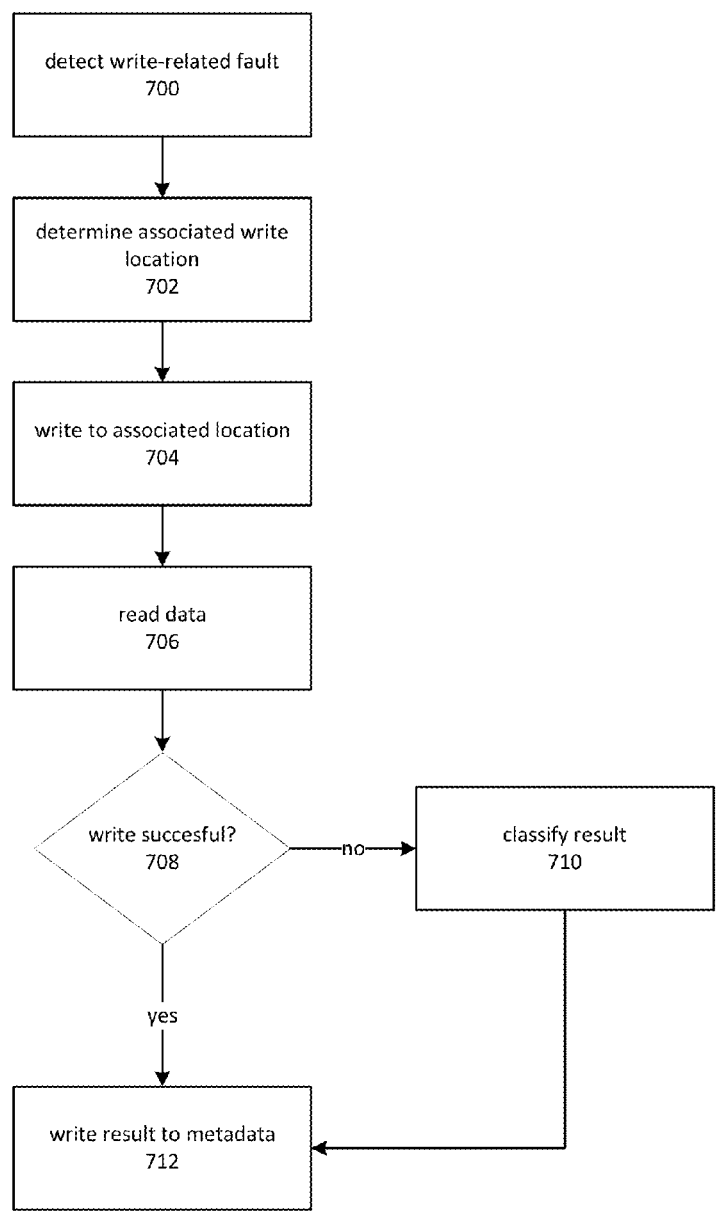
FIG. 7 is a flowchart depicting an embodiment of a diagnostic procedure for verifying a write-related fault.

FIG. 7 depicts an embodiment of a diagnostic procedure that may be performed in response to detecting a write-related fault, which may occur in software, firmware or hardware. Although depicted as a sequence of operations, those of ordinary skill in the art will appreciate that at least some of the depicted operations may be altered, omitted, reordered or performed in parallel.

At operation 700, a write-related fault may be detected. Various software exceptions, event log entries and so forth may be monitored for errors, exceptions, events or other conditions of a type that are potentially related to write faults. A write fault may be described as a failure related to storing data in a storage device or memory, including but not limited to mechanical disk drives, solid-state disk drives, random-access memory and so forth. Write-related faults may be described as errors, exceptions, events or other conditions that may result as a consequence of a write fault. For example, an operation to store an item of data in a database management system might fail for a variety of reasons, including but not necessarily limited to a write fault. Performance of an additional diagnostic procedure may determine or confirm that the underlying cause of the error was a write fault.

At operation 702, a location associated with or near the suspected write fault may be located. A associated location may be described as a storage device, disk sector, disk platter, memory region and so forth potentially related to the suspected write fault. A wide variety of approaches may be used. Some embodiments may employ a pre-populated table that provides a mapping between computing nodes, processes, tables and so forth to associated write locations. For example, it may be known that writes to a certain table utilize a specific storage device. Other embodiments may interface with storage device firmware to identify memory regions, memory blocks, disk platters and so forth where data related to the suspected write fault was located. Another approach involves using prior write locations, log files, event logs and so forth to determine which location should be tested. In some embodiments, checksums may be written both to storage and to a log file or event log for later comparison. For some storage devices, such as flash memory devices, read or write errors in multiple locations may be detected. An associated memory region or component that is common to the errors may be selected as the associated location.

In some cases, a good approximation of the write location may not be available. In these cases, some embodiments may utilize a spectrum of write locations. Other embodiments may default to using a predefined set of one or more storage devices likely to have been involved in the suspected write fault.

At operation 704, information may be written to the location or locations selected at operation 702. The information may conform to a known pattern or incorporate a checksum value allowing the write to be verified. Some embodiments may, however, not utilize these measures, instead relying on an operating system, storage device firmware or other mechanism to confirm that the write was successful. Operation 706 depicts verifying that the write succeeded.

As depicted by operation 708, an unsuccessful write operation may be followed by a classification of the result, as depicted by operation 710, and writing the result to a metadata store as depicted by operation 712. If the write was successful, a record of the success may be written to a metadata store, also depicted by operation 712.

Figure 8:
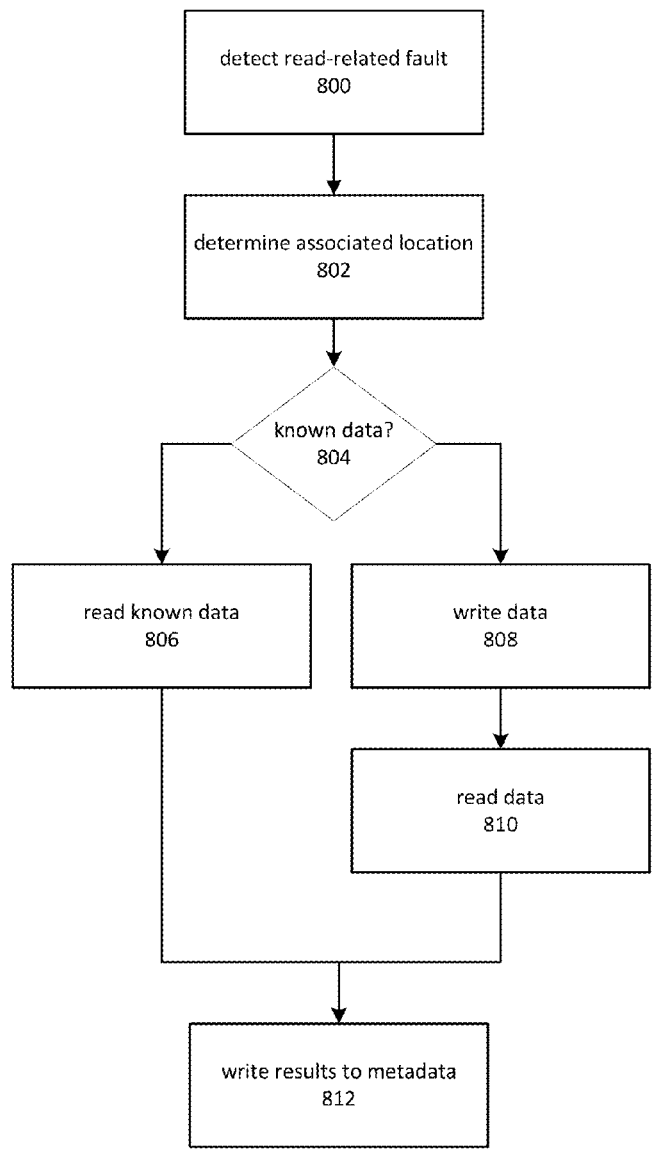
FIG. 8 is a flowchart depicting an embodiment of a diagnostic procedure for verifying a read-related fault.

FIG. 8 depicts an embodiment of a diagnostic procedure that may be performed in response to a read-related fault. Read-related faults may be observed as software exceptions, event log entries and so forth in areas of software code related to read operations on a storage device, in firmware code or in the storage device itself. Although the illustrative embodiment of FIG. 8 is depicted as a sequence of operations, those of ordinary skill in the art will appreciate that at least some of the depicted operations may be altered, omitted, reordered or performed in parallel.

At operation 800, a read-related fault may be detected. Detecting a fault may involve classifying the originating error, software exception, event log entry and so forth and determining that it may have been caused by a read fault. Performing a diagnostic procedure, such as the diagnostic procedure depicted by FIG. 8, may help confirm that the error was the result of a read fault.

At operation 802, a location associated with or near the suspected read fault may be determined. This may occur in a manner similar to that discussed previously regarding suspected write faults. Operation 804 depicts determining whether a known data value resides at the associated location determined at operation 802. If so, a read operation may be attempted at that location to determine the nature of the read-related fault. This is depicted by operation 806. If the read operation fails to return the expected value, it may be concluded that a read fault occurred. An entry describing the success or failure of the diagnostic procedure may then be written to a metadata store, as depicted by operation 812.

Embodiments may retain knowledge of data previously written to storage devices. For example, when a database page is written to a storage device, a checksum value may be written in the database page header. The checksum value may be stored in an alternate location for use with subsequent read-related operations pertaining to the same database page.

If a known data value is not nearby the location of the suspected read fault, a write operation may be performed on a nearby location. This is depicted by operation 808. Should the write succeed, the value may then be read back from the same location, as depicted by operation 810. In some cases, the write operation may fail. This may confirm the suspected read fault without the need to perform a subsequent read. The success or failure of the aforementioned diagnostic procedure may be written to a metadata store, as depicted by operation 812.

Figure 9:
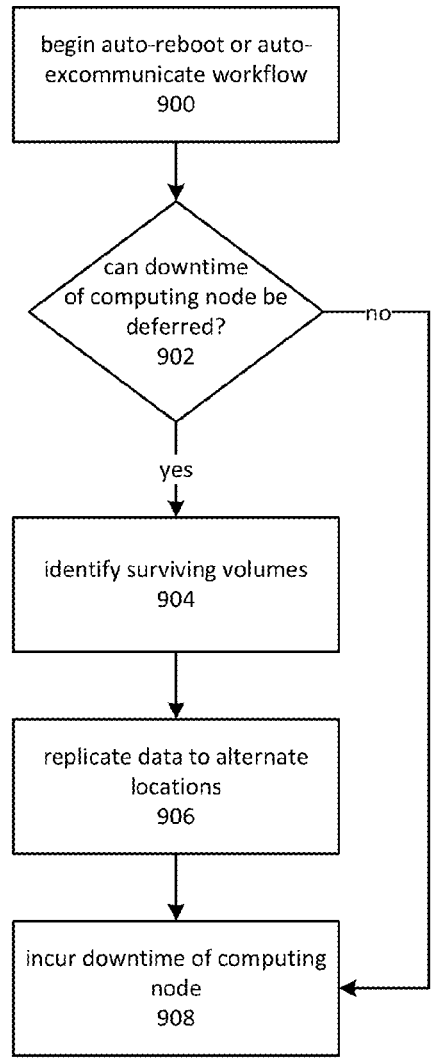
FIG. 9 is a flowchart depicting an example of a fault recovery workflow.

Embodiments may employ automated recovery workflows to reduce downtime that might be associated with automatic rebooting or excommunication. In some cases, faulting computing nodes may be accessible and functioning to some degree, depending upon the type of fault. In such cases, operations that may reduce time to recovery may be performed prior to rebooting or excommunicating a computing node. One such example is depicted by FIG. 9. Although the example of FIG. 9 is depicted as a sequence of operations, those of ordinary skill in the art will appreciate that at least some of the depicted operations may be altered, omitted, reordered or performed in parallel.

At operation 900, a workflow corresponding to an automatic reboot, excommunication or similar procedure may be initiated for a computing node. The workflow may be initiated due to a fault encountered on the computing node. Embodiments may also initiate workflow or excommunication operations in order to perform scheduled maintenance, to debug a fault, retire outdated hardware and so forth. As described herein, a workflow may comprise a series of actions that may be orchestrated by a process such as an auto administration process. In some cases, a workflow may describe dependencies between actions or an order in which actions should be taken. Records describing the actions to be taken may be stored persistently. Embodiments may utilize a metadata store, relational database management system or other mechanism to perform this function. Embodiments may also maintain in-memory data structures. In some cases, the records describing desired actions may be made durable upon initially scheduling the workflow. In some cases, a relatively long period of time may elapse between scheduling the workflow and performing an action described in the workflow. Embodiments may also associate expiration dates with the actions described by the workflow, or associate the action with a verification step that may confirm the action is still needed.

Operation 902 depicts determining that node downtime may be deferred. This may occur with partial hard faults, such as when one storage device has failed but other storage devices connected to the same computing node remain available. Rebooting or excommunicating a computing node might then be delayed, so that various actions could be taken to minimize the impact of node downtime on the distributed computing system. In this context, minimizing impact on the distributed computing system may involve copying data from operational volumes on the faulting computing node to other locations. Operation 902 may also involve deferring downtime so that the level of risk caused by the downtime may be reduced. For example, in a group of clusters, downtime for a computing node in one cluster might be deferred until a computing node in another cluster has finished a reboot cycle.

Accordingly, deferring downtime as depicted by operation 902 may involve various determinations regarding the length of the deferral and/or scheduling of the downtime. One such determination involves the maximum length of time that the downtime can be deferred. In some cases, the detected fault may be associated with a high risk of immediate failure and embodiments may determine that downtime should not be deferred, or should be deferred for only a short period. Based on factors such as the risk of deferral, expected time to failure and so forth, a set of actions may be selected based on maximizing the value of performing those actions during the period of deferral that is available.

Another determination that may be made regarding deferral of downtime is risk associated with undergoing downtime, particularly with respect to other computing nodes in the same cluster as the faulting computing node, and to other clusters within the distributed computing system. As noted, embodiments may attempt to avoid incurring downtime on one computing node when nodes in the same cluster, or in other clusters within the same system, are also undergoing downtime. The risk of simultaneous downtime may also be evaluated against the risk of deferring downtime. In some cases, a computing node may have a high probability of immediate failure. In such cases embodiments may determine to undergo immediate downtime even if other computing nodes in the same cluster, or in a related cluster, are currently undergoing downtime.

FIG. 9 depicts operations 904 and 906 as one example of a set of actions that may be performed during a period of deferral. Numerous other combinations and sequences are possible. In the example of FIG. 9, data on operational volumes may be replicated or copied to other locations prior to incurring node downtime, so that the data may remain available to the distributed computing system while the faulting node is rebooted or otherwise made temporarily unavailable, or after the faulting node is excommunicated.

Operation 904 depicts identifying data or volumes of data that remain accessible after the fault. In some cases and embodiments, the data may remain accessible through the faulting computing node. In others, the data may be accessible through an alternate path. The surviving data or volumes of data may be identified through various means such as the performance of diagnostic procedures, mapping or rule-based techniques and so forth.

Operation 906 depicts replicating data from the faulting computing node, or directly from surviving volumes, to alternate locations. The alternate locations may be selected to enable the data to be accessible after the faulting computing node has been rebooted, excommunicated, or otherwise become unavailable. Data on the faulting node may be copied or replicated to multiple locations. The locations may comprise all other nodes in the cluster, or selected based on a variety of factors including, but not limited, available space or capacity on the receiving computing node or storage location. Data may be replicated to the alternate locations using various replication processes, including log shipping and copying data files. Embodiments may activate the replicated data during or after replication, so that the data is made accessible to users of the associated distributed computing system.

Embodiments may also perform various steps in addition to or instead of replication. These include performing an orderly shutdown of the faulting node, copying data files, log files, configuration information and so forth. Embodiments may proactively schedule operations such as the ordering of replacement parts, imaging of a replacement computing node, scheduling availability of technical personnel and so forth.

At operation 908, the deferral period may end and the faulting computing node may be rebooted or excommunicated. In the case of node downtime incurred as the result of a reboot, the computing node may subsequently come online again and resume normal operations. Embodiments may then replicate new data back to the recovered computing node. Some embodiments may deactivate copies of data replicated to alternate locations, while others may continue to operate without deactivating the data.

Embodiments may analyze or classify operations to assign a level of risk to each operation, and may also compute aggregate risk for a sequence of operations. This may be done, for example, by performing constructing a decision tree structure. By traversing the structure, an aggregate risk for a sequence of operations may be computed. Embodiments may also assign levels of benefit to each node, allow for computation of an optimal cost versus benefit path. Accordingly, various embodiments may perform selection or ordering of operations based on levels of risk and/or a cost versus benefit analysis. The levels of risk associated with each operation may be adjusted based on inputs from other computing nodes or clusters. For example, the risk of some function of a distributed computing system may be increased when one or more computing node constituents of the distributed system are unavailable.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

Figure 10:
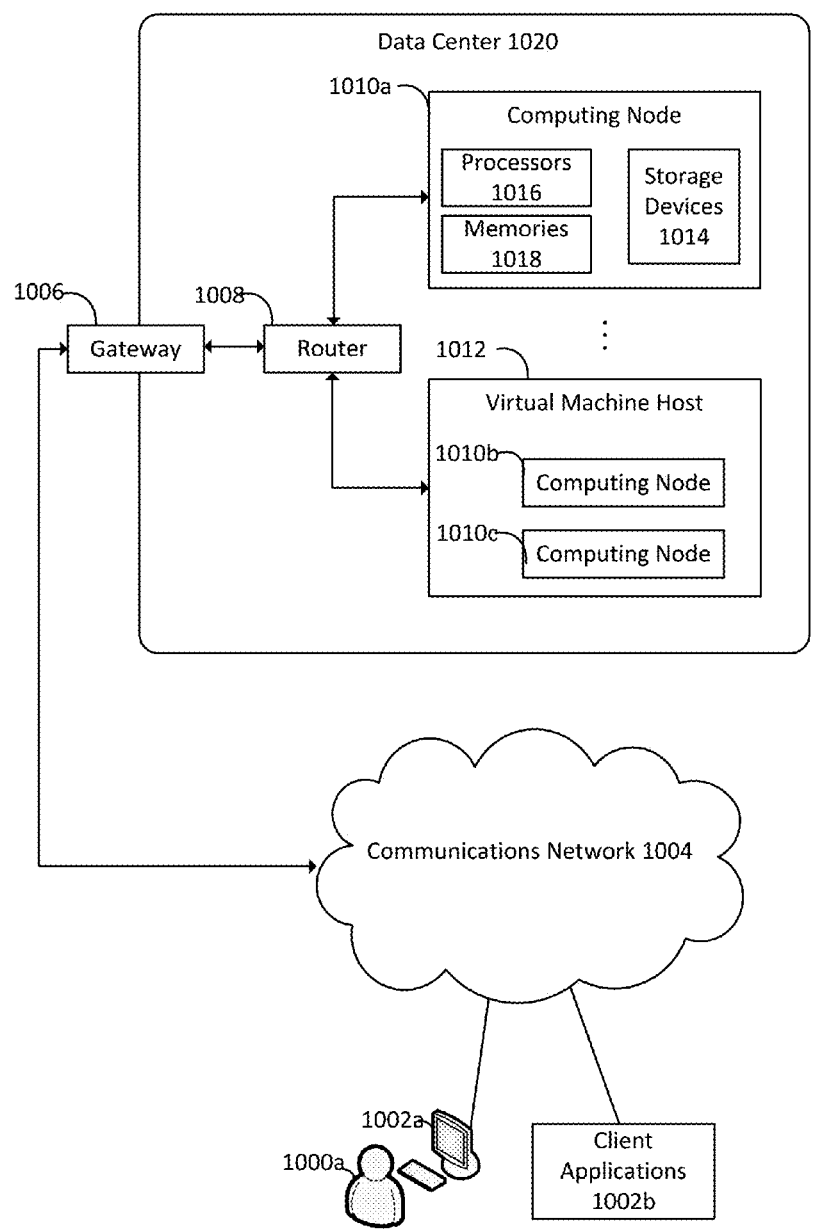
FIG. 10 is a block diagram depicting an embodiment of a computing environment in which aspects of the present disclosure may be practiced.

FIG. 10 is a diagram depicting an example of a distributed computing environment on which aspects of the present invention may be practiced. Various users 1000a may interact with various client applications, operating on any type of computing device 1002a, to communicate over communications network 804 with processes executing on various computing nodes 1010a, 1010b and 1010c within a data center 1020. Alternatively, client applications 1002b may communicate without user intervention. Communications network 1004 may comprise any combination of communications technology, including the Internet, wired and wireless local area networks, fiber optic networks, satellite communications and so forth. Any number of networking protocols may be employed.

Communication with processes executing on the computing nodes 1010a, 1010b and 1010c, operating within data center 1020, may be provided via gateway 1006 and router 1008. Numerous other network configurations may also be employed. Although not explicitly depicted in FIG. 10, various authentication mechanisms, web service layers, business objects or other intermediate layers may be provided to mediate communication with the processes executing on computing nodes 1010a, 1010b and 1010c. Some of these intermediate layers may themselves comprise processes executing on one or more of the computing nodes. Computing nodes 1010a, 1010b and 1010c, and processes executing thereon, may also communicate with each other via router 1008. Alternatively, separate communication paths may be employed. In some embodiments, data center 1020 may be configured to communicate with additional data centers, such that the computing nodes and processes executing thereon may communicate with computing nodes and processes operating within other data centers.

Computing node 10 is depicted as residing on physical hardware comprising one or more processors 1016, one or more memories 1018 and one or more storage devices 1014. Processes on computing node 1010a may execute in conjunction with an operating system or alternatively may execute as a bare-metal process that directly interacts with physical resources such as processors 1016, memories 1018 or storage devices 1014.

Computing nodes 1010b and 1010c are depicted as operating on virtual machine host 1012, which may provide shared access to various physical resources such as physical processors, memory and storage devices. Any number of virtualization mechanisms might be employed to host the computing nodes.

The various computing nodes depicted in FIG. 10 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A distributed database system comprising:
a plurality of computing nodes comprising at least a first subset of the plurality of computing nodes, the first subset configured to perform a distributed computing function, one or more of the plurality of computing nodes configured at least to:
detect a fault involving the first subset of the plurality of computing nodes;
perform one or more diagnostic procedures involving at least a component connected to a first computing node of the first subset of the plurality of computing nodes, the one or more diagnostic procedures selected based at least in part on determining that the component is a potential origin of the fault;
perform a first one or more operations involving the first computing node, the first one or more operations selected based at least in part on the performing of the one or more diagnostic procedures; and
reconfigure the first subset of the plurality of computing nodes to perform the distributed computing function without the first computing node upon determining that performing the first one or more operations has not resolved the fault.

2. The system of claim 1, wherein the fault corresponds to a first region of a storage device, one or more of the plurality of computing nodes further configured at least to:
select a second region of the storage device based at least in part on association with the first region; and
perform at least one diagnostic procedure, of the one or more diagnostic procedures, that performs a read or write operation on the second region of the storage device.

3. The system of claim 1, further comprising one or more storage devices configured to store information indicative of the fault, one or more of the plurality of computing nodes configured at least to:
perform a second one or more operations upon determining that performing the first one or more operations has not resolved the fault, the second one or more operations selected based at least in part on one or more of recovery, repair, or replacement of the first computing node.

4. The system of claim 1, the system further configured at least to:
repeat at least one of the one or more diagnostic procedures after rebooting the first computing node.

5. A method for fault recovery comprising:
detecting a fault involving a first subset of a plurality of computing nodes, the first subset configured to perform a distributed computing function;
performing, by at least one of the plurality of computing nodes, one or more diagnostic procedures involving at least a component of a first computing node of the first subset of the plurality of computing nodes, the one or more diagnostic procedures selected based at least in part on determining, by at least one of the plurality of computing nodes, that the component is a potential origin of the fault;
selecting, by at least one of the plurality of computing nodes, a first one or more operations involving the first computing node, the first one or more operations selected based in part on the performing of the one or more diagnostic procedures; and
reconfiguring the first subset of the plurality of computing nodes to stop the first computing node from performing the distributed computing function upon determining that performing the first one or more operations has not resolved the fault.

6. The method of claim 5, wherein the fault corresponds to a first region of a storage device, further comprising:
selecting a second region of the storage device based at least in part on association with the first region; and
performing at least one diagnostic procedure, of the one or more diagnostic procedures, that performs a read or write operation on the second region of the storage device.

7. The method of claim 5, further comprising:
repeating at least one of the one or more diagnostic procedures after rebooting the first computing node.

8. The method of claim 5, wherein the distributed computing function involves storage and retrieval of data.

9. The method of claim 8, further comprising:
replicating data from the first computing node to at least one of the plurality of computing nodes prior to reconfiguring the first subset of the plurality of computing nodes.

10. The method of claim 5, further comprising:
storing information indicative of the fault on one or more storage devices; and
selecting the first one or more operations based at least in part on retrieving the information from the one or more storage devices.

11. The method of claim 5, further comprising:
storing information indicative of the first one or more operations on one or more storage devices and indicative of an order in which to perform the first one or more operations.

12. The method of claim 5, further comprising:
selecting, by at least one of the plurality of computing nodes, a second one or more operations involving the first computing node, the second one or more operations selected based at least in part on one or more of recovery, repair, or replacement of the first computing node.

13. The method of claim 12, further comprising:
postponing performance of at least one of the first one or more operations or the second one or more operations based at least in part on an operational status of a second subset of the plurality of computing nodes.

14. A non-transitory computer-readable storage medium having stored thereon instructions that, upon execution by a computing device, cause the computing device at least to:
receive information indicative of a fault involving a first subset of a plurality of computing nodes, the first subset configured to perform a distributed computing function;
select one or more diagnostic procedures, the one or more diagnostic procedures involving at least a component of a first computing node of the first subset of the plurality of computing nodes, the one or more diagnostic procedures selected based at least in part on determining that the component is a potential origin of the fault;
select a first one or more operations involving the first computing node, the first one or more operations selected based at least in part on performing the one or more diagnostic procedures; and
select a second one or more operations involving the first computing node upon determining that performing the first one or more operations has not resolved the fault, wherein the second one or more operations comprises excluding the first computing node from performing the distributed computing function.

15. The computer-readable storage medium of claim 14, comprising further instructions that, upon execution by the computing device, cause the computing device to at least:

receive information indicative of a read or write operation on a first region of a storage device, the operation corresponding to the fault.

16. The computer-readable storage medium of claim 14, comprising further instructions that, upon execution by the computing device, cause the computing device to at least:

receive information indicative of operational status corresponding to at least one of the plurality of computing nodes other than the first computing node.

17. The computer-readable storage medium of claim 14, comprising further instructions that, upon execution by the computing device, cause the computing device to at least:

determine to replicate data from the first computing node to at least one of the plurality of computing nodes, the determination based at least in part on performing the one or more diagnostic procedures.

18. The computer-readable storage medium of claim 14, further comprising selecting the second one or more operations based at least in part on one or more of recovery, repair, or replacement of the first computing node.

19. The computer-readable storage medium of claim 14, comprising further instructions that, upon execution by the computing device, cause the computing device to at least:

calculate a level of risk associated with performing an operation involving the first computing node, the level of risk corresponding to a likelihood of ceasing to perform the distributed computing function.

20. The computer-readable storage medium of claim 14, wherein at least one of the first one or more operations or the second one or more operations involves personnel scheduling.

* * * * *